(12) United States Patent
Kawamura et al.

(10) Patent No.: US 10,604,094 B2
(45) Date of Patent: Mar. 31, 2020

(54) IMPACT ABSORBING MEMBER STRUCTURE OF VEHICLE

(71) Applicant: MAZDA MOTOR CORPORATION, Aki-gun, Hiroshima (JP)

(72) Inventors: Chikara Kawamura, Hiroshima (JP); Tsuneki Shimanaka, Hiroshima (JP); Hiroaki Takeshita, Hiroshima (JP); Tsuyoshi Nishihara, Hiroshima (JP); Takayuki Kimura, Higashihiroshima (JP); Kazutaka Ishikura, Onomichi (JP)

(73) Assignee: Mazda Motor Corporation, Aki-gun, Hiroshima (JP)

(*) Notice: Subject to any disclaimer, the term of this patent is extended or adjusted under 35 U.S.C. 154(b) by 21 days.

(21) Appl. No.: 15/760,195

(22) PCT Filed: Nov. 8, 2016

(86) PCT No.: PCT/JP2016/083075
§ 371 (c)(1),
(2) Date: Mar. 14, 2018

(87) PCT Pub. No.: WO2017/086205
PCT Pub. Date: May 26, 2017

(65) Prior Publication Data
US 2018/0257589 A1    Sep. 13, 2018

(30) Foreign Application Priority Data

Nov. 20, 2015   (JP) .................................. 2015-227625

(51) Int. Cl.
*B60R 19/34* (2006.01)
*B62D 21/15* (2006.01)
(Continued)

(52) U.S. Cl.
CPC .............. *B60R 19/34* (2013.01); *B60R 19/24* (2013.01); *B62D 21/152* (2013.01); *F16F 7/00* (2013.01);
(Continued)

(58) Field of Classification Search
CPC ... B60R 19/34; B60R 19/24; B60R 2019/262; F16F 7/00; F16F 7/003; F16F 2224/0241; B62D 21/152
See application file for complete search history.

(56) References Cited

U.S. PATENT DOCUMENTS

| | | | |
|---|---|---|---|
| 6,406,088 | B1 | 6/2002 | Tate |
| 2015/0069773 | A1 | 3/2015 | Mukainakano et al. |

FOREIGN PATENT DOCUMENTS

| | | |
|---|---|---|
| JP | 2000081069 A | 3/2000 |
| JP | 2004116564 A | 4/2004 |

(Continued)

OTHER PUBLICATIONS

ISA Japan Patent Office, International Search Report Issued in PCT Application No. PCT/JP2016/083075, dated Feb. 7, 2017, WIPO, 1 page.

*Primary Examiner* — D Glenn Dayoan
*Assistant Examiner* — Melissa Ann Bonifazi
(74) *Attorney, Agent, or Firm* — Alleman Hall Creasman & Tuttle LLP

(57) ABSTRACT

An impact absorbing member structure of a vehicle includes: a pair of left and right rear side frames; a pair of left and right crash cans containing a plurality of first carbon fibers arranged so as to continuously extend in a forward/rearward direction; and a bumper reinforcement attached to tip end portions of the pair of rear side frames through the pair of crash cans. Each of the crash cans is formed as an open-section member including: a side wall portion extend- (Continued)

ing in the forward/rearward direction; and a tip end wall portion continuous with the side wall portion and including an attaching portion to which the bumper reinforcement is attached.

8 Claims, 11 Drawing Sheets

(51) Int. Cl.
*F16F 7/00* (2006.01)
*B60R 19/24* (2006.01)
*B60R 19/26* (2006.01)

(52) U.S. Cl.
CPC ........ *F16F 7/003* (2013.01); *B60R 2019/262* (2013.01); *F16F 2224/0241* (2013.01)

(56) References Cited

FOREIGN PATENT DOCUMENTS

| | | | |
|---|---|---|---|
| JP | 2007015626 | A | 1/2007 |
| JP | 2008296823 | A | 12/2008 |
| JP | 201555271 | A | 3/2015 |
| JP | 2015055257 | A | 3/2015 |
| JP | 2017002998 | A | 1/2017 |
| WO | 2010100716 | A1 | 9/2010 |

IMPACT ABSORBING MEMBER STRUCTURE OF VEHICLE

TECHNICAL FIELD

The present invention relates to an impact absorbing member structure of a vehicle, the impact absorbing member structure including a bumper reinforcement attached to tip end portions of a pair of left and right impact absorbing members made of fiber-reinforced resin, the pair of left and right impact absorbing members each containing a plurality of reinforced fibers continuously extending in a forward/rearward direction.

BACKGROUND ART

A structure has been conventionally known, in which: a pair of left and right front side frames are provided at a vehicle body front portion, or a pair of left and right rear side frames are provided at a vehicle body rear portion; and a bumper reinforcement extending in a vehicle width direction is attached to tip end portions of these side frames through a pair of left and right crash cans (also called crush boxes) capable of absorbing impact energy in collision.

The pair of crash cans are typically molded by a metal material. In vehicle collision, the pair of crash cans cause compression fracture in an axial direction to absorb impact energy transmitted to a vehicle interior.

It is also known that since the crash can is a large component, the crash can is constituted by a fiber-reinforced resin molded body for the purpose of a weight reduction of a vehicle body.

Examples of the reinforced fiber used as a reinforcing member include a glass fiber, a carbon fiber, and a metal fiber. The fiber-reinforced resin is formed by combining the reinforced fibers with a base material (matrix).

According to such fiber-reinforced resin, the reinforced fibers take charge of dynamic characteristics, such as strength, and the base material resin takes charge of a stress transmission function between the fibers and a fiber protection function.

Especially, carbon fiber resin (Carbon-Fiber-Reinforced-Plastic: CFRP) has both high specific strength (strength/specific gravity) and high specific rigidity (rigidity/specific gravity), so to speak, both lightness and strength or rigidity. Therefore, the carbon fiber resin is widely used as a structural material for aircrafts, vehicles, and the like.

An impact absorbing member of PTL 1 is an impact absorbing member made of a composite material containing synthetic resin and carbon fibers, and an impact fracture temperature of the impact absorbing member is set to a range of −15° C. or more and +50° C. or less of a glass transition temperature of the resin. With this, high energy absorbing performance is secured.

PTL 1 discloses that this impact absorbing member is formed in a tubular shape, a columnar shape, a closed-section prism shape, or the like.

Performance required for impact absorbing members is a large energy absorption amount (hereinafter referred to as an EA amount) and a stable absorption of impact energy by progressive fracture in which compression fracture proceeds progressively.

CITATION LIST

Patent Literature

PTL 1: Japanese Laid-Open Patent Application Publication No. 2004-116564

SUMMARY OF INVENTION

Technical Problem

The present applicant has considered a carbon fiber resin structural body capable of causing the progressive fracture in vehicle collision (Japanese Patent Application No. 2015-117520).

The carbon fiber resin structural body considered by the present applicant includes: a plurality of first carbon fiber layers in which carbon fibers are arranged so as to extend in a compressive load input direction; and a plurality of second carbon fiber layers in which carbon fibers are arranged so as to extend and intersect with the carbon fibers of the first carbon fiber layers. One or more second carbon fiber layers in which the carbon fibers extend in a direction intersecting with the compressive load input direction are provided at each of both thickness direction end vicinity parts of a fiber-reinforced resin plate member such that when a compressive load is input, both thickness direction end parts of the fiber-reinforced resin plate member are peeled off via the second carbon fiber layers.

With this, based on the second carbon fiber layers as boundaries, a columnar pillar portion can be formed by the first carbon fiber layers located at a thickness direction inner side of the second carbon fiber layers, and a branched fronds portion can be formed by the first carbon fiber layers located at a thickness direction outer side of the second carbon fiber layers.

According to this carbon fiber resin structural body, the progressive fracture of both thickness direction end portions of the fiber-reinforced resin can be surely and stably caused in vehicle collision, and this can increase the EA amount.

However, there is a possibility that the progressive fracture by the fiber-reinforced resin cannot effectively contribute to the EA amount.

Typically, a base end portion of the crash can is fastened to a tip end portion of the side frame through, for example, a set plate by a bolt. Therefore, when the crash can is formed by using fiber-reinforced resin, a fiber cut part is formed at a base end-side part of the crash can by the formation of a bolt hole.

When the fiber cut part is formed at the base end-side part of the crash can, there is a possibility that: the fiber cut part becomes a fracture start point in vehicle collision based on a strength difference between the base end-side part that is a support-side end portion and a tip end-side part that is a compressive load input direction-side end portion; and the fracture of the base end-side part of the crash can starts earlier than the fracture of the tip end-side part of the crash can.

Even when the fiber cut part is not formed by the bolt hole, this fracture phenomenon in which the fracture of the base end-side part of the crash can starts earlier may occur due to a structural factor.

When the fracture of the base end-side part of the crash can starts earlier, the fracture of the base end-side part proceeds intensively, and a center axis direction of the crash can and the compressive load input direction deviate from each other. As a result, there is a possibility that the crash can cannot be completely crushed by the compressive load in collision.

Further, when the crash can is formed as a closed-section member extending in a vehicle body forward/rearward direction, there is a possibility that: in vehicle collision, progressively fractured fiber-reinforced resins, i.e., so-called resin fragments are accumulated in the crash can; and although the crash can itself still has a capacity in terms of performance, the progressively fractured fiber-reinforced resins hinder progressive fracture performance of the crash can.

To be specific, there is still room for improvement in terms of structure to secure stable EA performance in a crash can configured to absorb impact energy by using progressive fracture.

An object of the present invention is to provide, for example, an impact absorbing member structure of a vehicle, the impact absorbing member structure being capable of securing stable EA performance in vehicle collision.

Solution to Problem

A first aspect of the present invention is an impact absorbing member structure of a vehicle, the impact absorbing member structure including: a pair of left and right impact absorbing members arranged at a vehicle body forward/rearward direction tip end-side part of the vehicle and made of fiber-reinforced resin, the pair of left and right impact absorbing members each containing a plurality of reinforced fibers arranged so as to continuously extend in a forward/rearward direction; and a bumper reinforcement attached to tip end portions of the pair of impact absorbing members and extending in a vehicle width direction, wherein each of the impact absorbing members is formed as an open-section member including a tip end wall portion formed at a tip end portion of the impact absorbing member, the bumper reinforcement being attached to the tip end wall portion.

The first aspect of the present invention includes the pair of left and right impact absorbing members made of the fiber-reinforced resin and each containing the plurality of reinforced fibers arranged so as to continuously extend in the vehicle body forward/rearward direction. Therefore, in vehicle collision, impact energy can be absorbed by using progressive fracture of the impact absorbing members.

Each of the impact absorbing members is formed as the open-section member including the tip end wall portion formed at the tip end portion of the impact absorbing member, the bumper reinforcement being attached to the tip end wall portion. Therefore, in vehicle collision, the progressively fractured fiber-reinforced resins are not accumulated in the impact absorbing member and can be discharged to an outside of the impact absorbing member. Thus, the impact absorbing member can be completely crushed.

A second aspect of the present invention is configured such that: in the first aspect of the present invention, each of the impact absorbing members includes a plurality of first reinforced fibers arranged so as to continuously extend in a vehicle body forward/rearward direction and constituting most of the reinforced fibers contained in the impact absorbing member and a plurality of second reinforced fibers arranged so as to continuously extend in a direction intersecting with the direction in which the first reinforced fibers extend; and in a vertical sectional view perpendicular to the forward/rearward direction, a plurality of curved portions are formed at each of the impact absorbing members.

According to this configuration, when parts corresponding to the first reinforced fibers causes delamination fracture, the second reinforced fibers form a fiber bridge between the first reinforced fibers, so that cutting energy generated when the second reinforced fibers are cut by a tensile load can be used for impact energy absorption.

A third aspect of the present invention is configured such that in the second aspect of the present invention, the plurality of curved portions are formed to have a plurality of partial circular-arc shapes.

According to this configuration, the tensile load can evenly act on the second reinforced fibers. Thus, the impact energy can be further absorbed.

A fourth aspect of the present invention is configured such that in any one of the first to third aspects of the present invention, each of the impact absorbing members is formed such that an upper-lower width thereof decreases toward the tip end portion.

According to this configuration, in vehicle collision, an input load per unit area of a tip end part of the impact absorbing member can be made larger than an input load per unit area of a base end-side part of the impact absorbing member, and a start point of progressive fracture can be surely formed at the tip end part.

A fifth aspect of the present invention is configured such that in the second aspect of the present invention, the plurality of second reinforced fibers are arranged at both thickness direction end vicinity parts of each of the pair of impact absorbing members.

According to this configuration, in vehicle collision, a pillar portion having a large width can be stably formed by reducing a thickness of a fronds portion formed at the fiber-reinforced resin, and this can increase the EA performance.

Advantageous Effects of Invention

According to the impact absorbing member structure of the vehicle of the present invention, the progressive fracture of the impact absorbing member can proceed from the tip end part to the base end-side part in vehicle collision, and this can secure stable EA performance.

DESCRIPTION OF EMBODIMENTS

Figure 1:
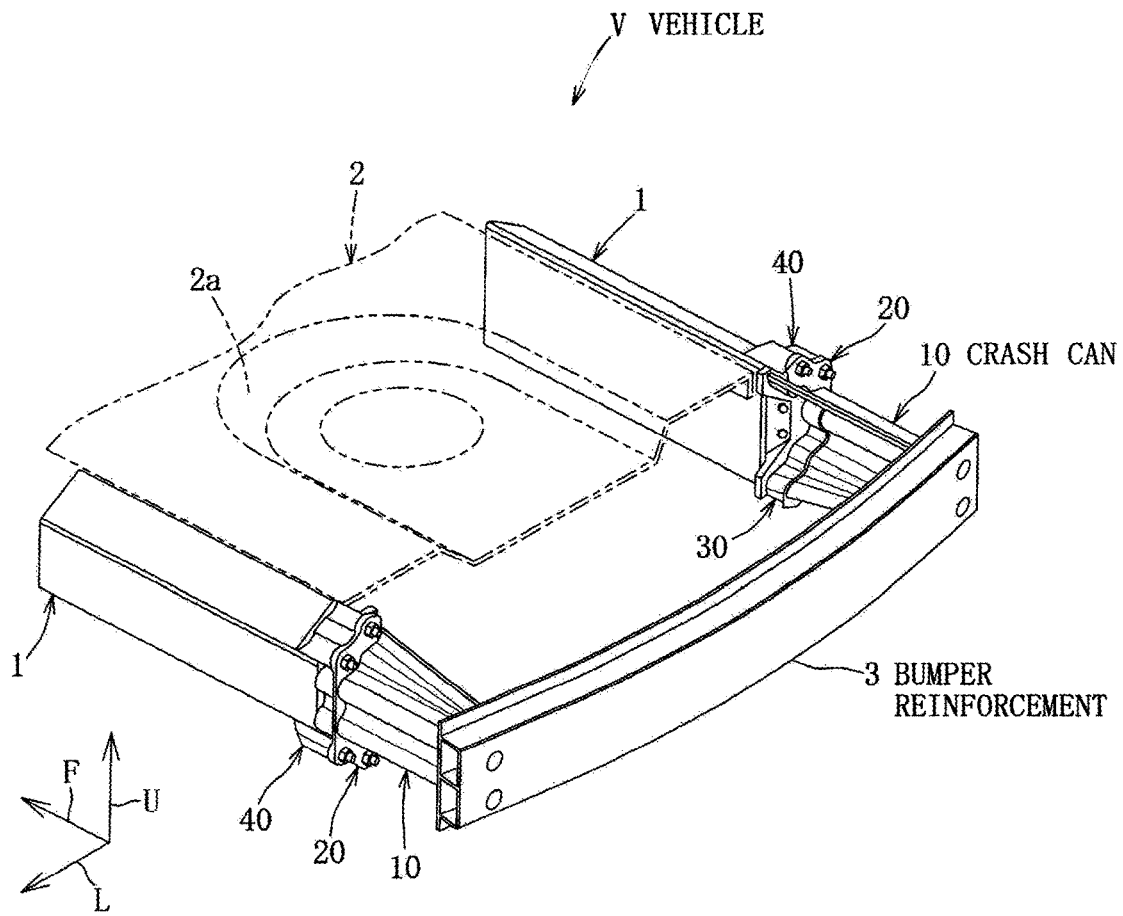
FIG. 1 is a perspective view of a vehicle body rear portion of a vehicle including an impact absorbing member structure according to Embodiment 1.

Hereinafter, embodiments of the present invention will be explained in detail based on the drawings.

The following will explain an example in which the present invention is applied to an impact absorbing structure at a vehicle body rear portion of a vehicle. The present invention, a product to which the present invention is applied, and applications of the present invention are not limited by the following explanation.

In the drawings, arrows F, L, and U show a front side, a left side, and an upper side, respectively.

Embodiment 1

Hereinafter, Embodiment 1 of the present invention will be explained based on FIGS. 1 to 15.

Figure 2:
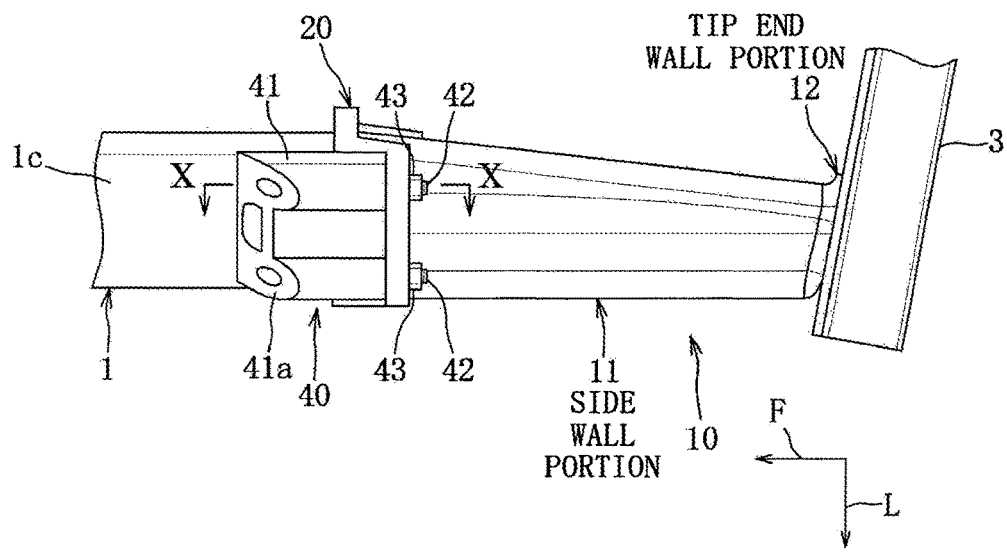
FIG. 2 is a plan view of a left vehicle body rear portion.
Figure 3:
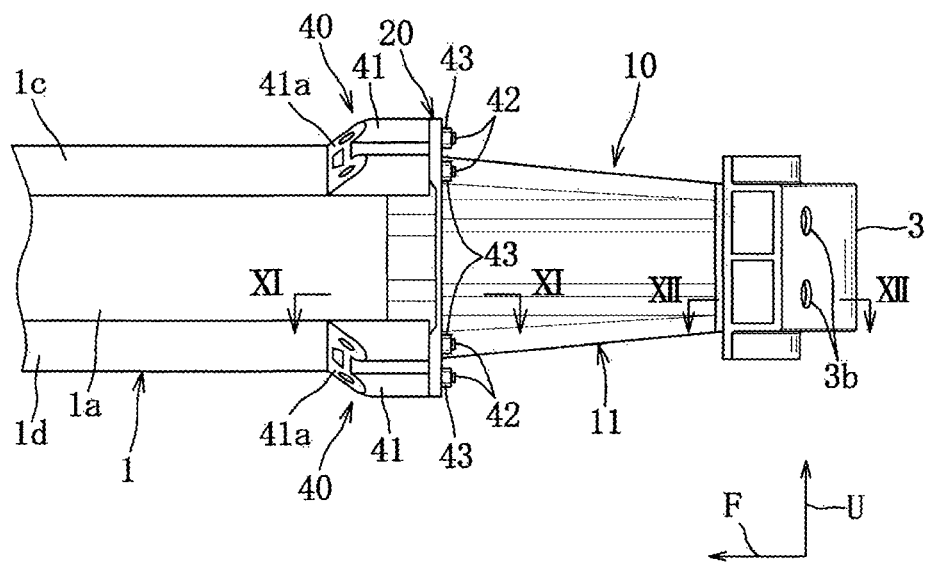
FIG. 3 is a side view of the left vehicle body rear portion.

As shown in FIGS. 1 to 3, a vehicle V includes: a pair of left and right rear side frames 1; a floor panel 2 provided so as to extend between the pair of rear side frames 1; a bumper reinforcement 3 extending in a leftward/rightward direction and including a rear-side outer peripheral part covered with a bumper fascia (not shown); a pair of left and right crash cans 10 (impact absorbing members) each provided between the corresponding rear side frame 1 and the bumper reinforcement 3; a pair of left and right outer brackets 20 and a pair of left and right inner brackets 30 for attaching the pair of crash cans 10 to the pair of rear side frames 1; and the like.

Since the above pair of left and right members are laterally symmetrical in terms of structure, the following will mainly explain the left member.

The rear side frame 1 is molded as an integral component by extrusion molding of an aluminum alloy material. The rear side frame 1 supports the floor panel 2 and the like and constitutes a closed section extending substantially horizontally and linearly in a forward/rearward direction.

The rear side frame 1 is formed to have a substantially trapezoidal section and includes: an outer wall portion 1a perpendicular to a leftward/rightward direction; an inner wall portion 1b arranged at a position on a right side of the outer wall portion 1a and in parallel with the outer wall portion 1a and having a larger upper-lower width than the outer wall portion 1a; an upper wall portion 1c coupling upper end portions of the outer and inner wall portions 1a and 1b; and a lower wall portion 1d coupling lower end portions of the outer and inner wall portions 1a and 1b.

The upper wall portion 1c is formed in such an inclined shape that a left part thereof is located at a lower position. The lower wall portion 1d is formed in such an inclined shape that a left part thereof is located at an upper position.

As shown in FIGS. 1 to 3, 5, 10, and 15, a pair of upper and lower bolt attaching members 40 are provided at respective rear end-side parts (tip end-side parts) of the upper and lower wall portions 1c and 1d.

Since the pair of upper and lower bolt attaching members 40 are symmetrical about a horizontal plane in terms of structure, the following will mainly explain the upper bolt attaching member 40.

The bolt attaching member 40 includes: a main body portion 41; two bolt portions 42 fixed to a rear end-side part of the main body portion 41 and extending rearward from a rear end portion of the main body portion 41; and the like.

The main body portion 41 is integrally formed by an aluminum alloy material such that two tubular bodies are located adjacent to each other so as to be spaced part from each other by a predetermined interval. A bottom portion of the main body portion 41 is joined to the rear end-side part of the upper wall portion 1c by welding.

Figure 10:
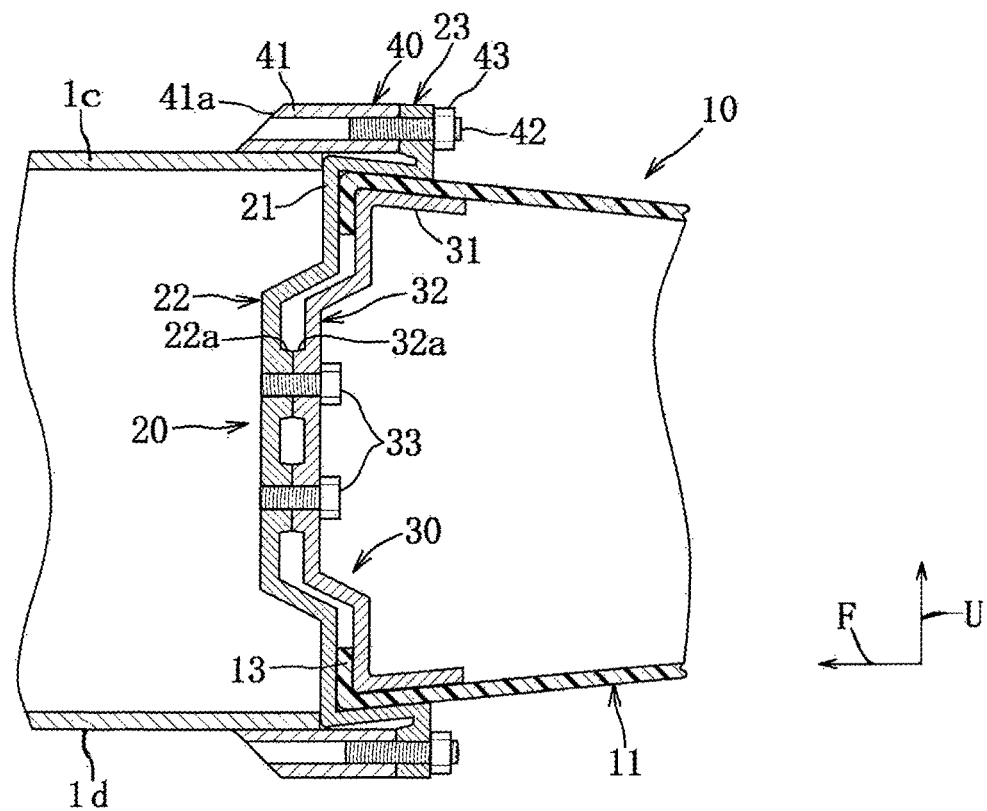
FIG. 10 is a sectional view taken along line X-X of FIG. 2.

As shown in FIG. 10, a rear end portion of the main body portion 41 is arranged so as to project rearward beyond a rear end portion of the upper wall portion 1c. A front wall portion 41a (base end-side wall portion) is formed at a front end part of the main body portion 41. The front wall portion 41a is configured in such an inclined shape that a front part thereof is located closer to the upper wall portion 1c. Therefore, a front-rear length of a ceiling part of the main body portion 41 is shorter than a front-rear length of a bottom part of the main body portion 41, and a front-rear length of the bottom part located at a rear side of the rear end portion of the upper wall portion 1c is shorter than a front-rear length of the bottom part located at a front side of the rear end portion of the upper wall portion 1c.

Screw portions with which nuts 43 can be threadedly engaged are formed at respective outer peripheral parts of the two bolt portions 42. The two bolt portions 42 are provided substantially in parallel with each other and adjacent to each other along an inclination direction of the upper wall portion 1c.

Front end-side parts of the bolt portions 42 are firmly fixed to an inside of the main body portion 41 such that front end portions of the bolt portions 42 are located at positions corresponding to the rear end portion of the upper wall portion 1c.

With this, while securing support strength of the bolt portions 42 and joining strength of the main body portion 41, the bolt attaching member 40 is reduced in size and weight.

Since the lower bolt attaching member 40 is symmetrical to the upper bolt attaching member 40 about a horizontal plane in terms of structure, a detailed explanation of the lower bolt attaching member 40 is omitted.

Next, the floor panel 2 and the bumper reinforcement 3 will be explained.

As shown in FIG. 1, a rear seat (not shown) is mounted on a front end-side part of the floor panel 2, and a spare tire pan 2a in which a spare tire (not shown) can be stored is formed at a rear end-side part of the floor panel 2. Both left and right end parts of the floor panel 2 are joined to the respective inner wall portions 1b of the pair of rear side frames 1 by welding. The spare tire pan 2a is formed so as to be concave downward at a portion of the floor panel 2, the portion corresponding to a trunk.

As shown in FIGS. 1 to 5, the bumper reinforcement 3 is molded as an integral component by extrusion molding of an aluminum alloy material.

The bumper reinforcement 3 constitutes a closed section extending substantially horizontally in the leftward/rightward direction and is formed in such a gently curved shape that a middle part of the bumper reinforcement 3 projects to the rear side in a plan view.

Figure 12:
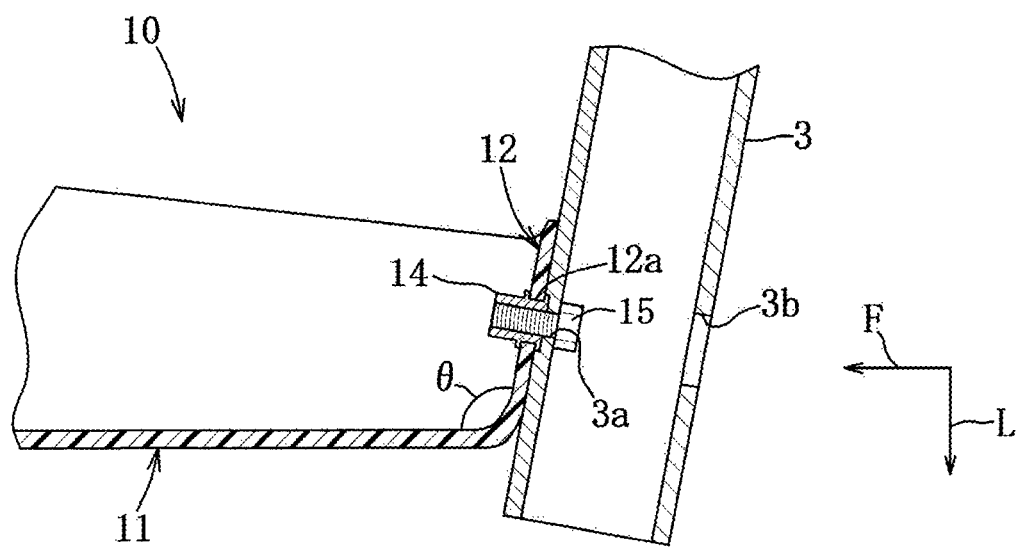
FIG. 12 is a sectional view taken along line XII-XII of FIG. 3.
Figure 13A:
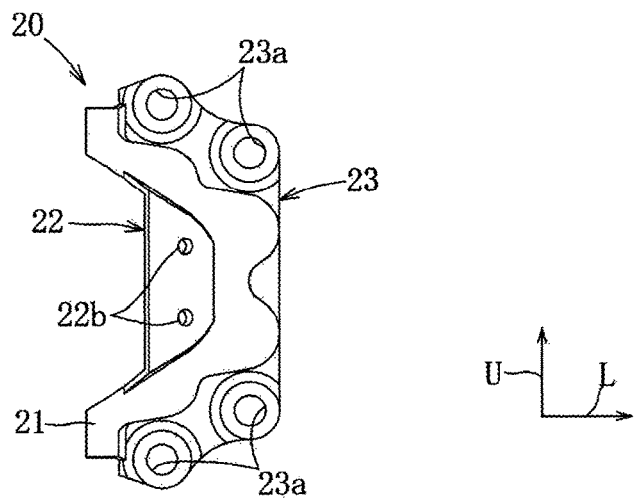
FIGS. 13A, 13B, 13C, and 13D are diagrams showing an outer bracket and are a front view, a rear view, a side view, and a plan view, respectively.
Figure 13B:
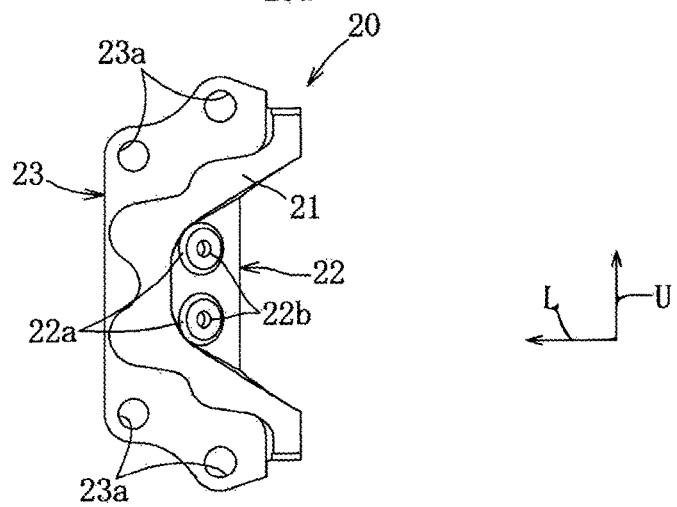
Figure 13C:
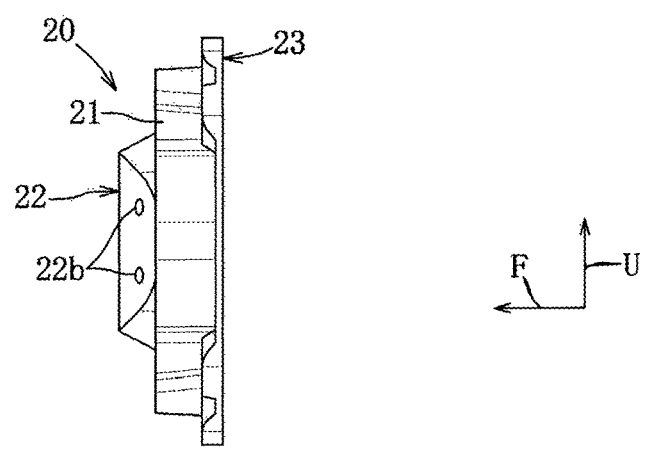
Figure 13D:
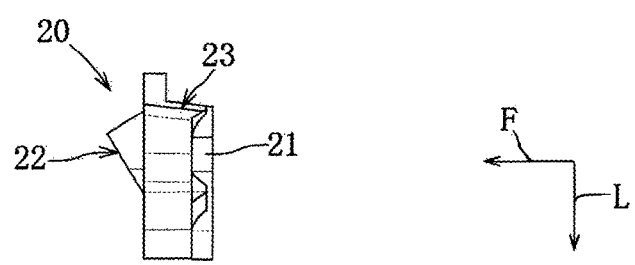
Figure 14A:
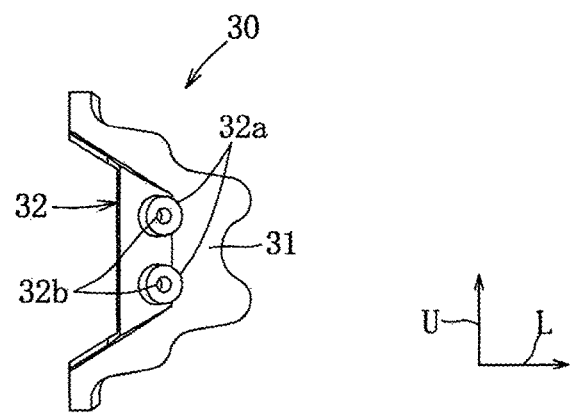
FIGS. 14A, 14B, 14C, and 14D are diagrams showing an inner bracket and are a front view, a rear view, a side view, and a plan view, respectively.
Figure 14B:
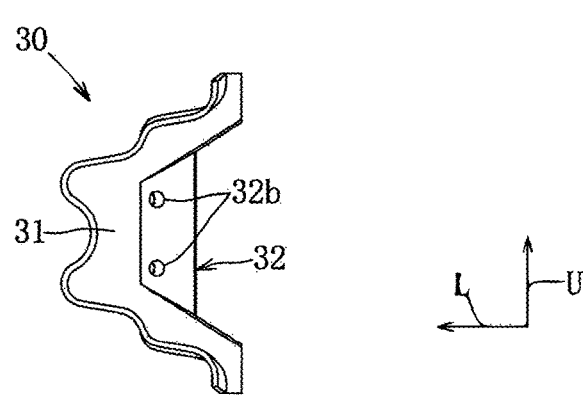
Figure 14C:
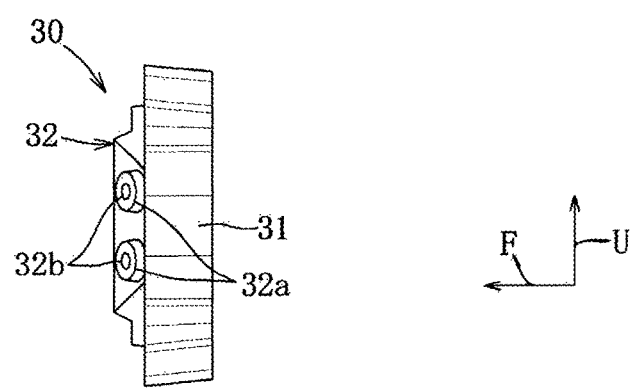
Figure 14D:
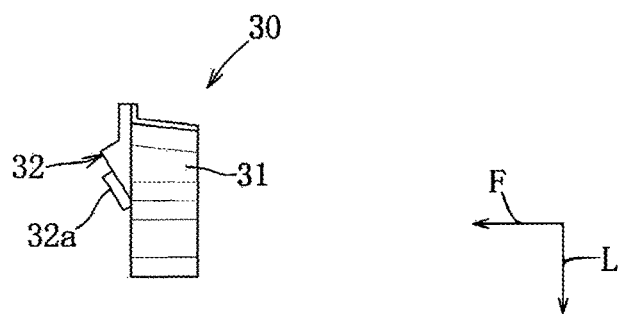

As shown in FIG. 12, a pair of upper and lower bolt holes 3a are formed at each of both left and right end-side parts of a front wall portion of the bumper reinforcement 3, and a pair of upper and lower work holes 3b for fastening work are formed at each of both left and right end-side parts of a rear wall portion of the bumper reinforcement 3.

Next, the crash can 10 will be explained.

The crash can 10 is integrally formed as an open-section member by molding (for example, RTM) of a carbon fiber resin (CFRP) molded body containing carbon fibers that are long fibers as a reinforcing member, the open-section member that is open at a right part (vehicle width direction inside part).

The RTM is a molding method in which: a preform of carbon fibers is set in a cavity of a shaping die which is dividable into upper and lower parts; and molten synthetic resin is injected into the cavity.

As shown in FIGS. 6 to 8 and 15, the crash can 10 includes: a side wall portion 11 extending in the forward/rearward direction; a tip end wall portion 12 extending from a rear end portion of the side wall portion 11 to the right side; a flange portion 13 extending from a front end portion of the side wall portion 11 to the right side; and the like.

The side wall portion 11 is configured in a substantially partial conical shape and is formed so as to be open to the right side such that in a vertical section perpendicular to the forward/rearward direction, a middle-stage part of the side wall portion 11 swells to the left side.

With this, in vehicle collision, the progressively fractured carbon fiber resins can be discharged to an outside of the crash can 10. Thus, the crash can 10 can be completely crushed.

Figure 6:
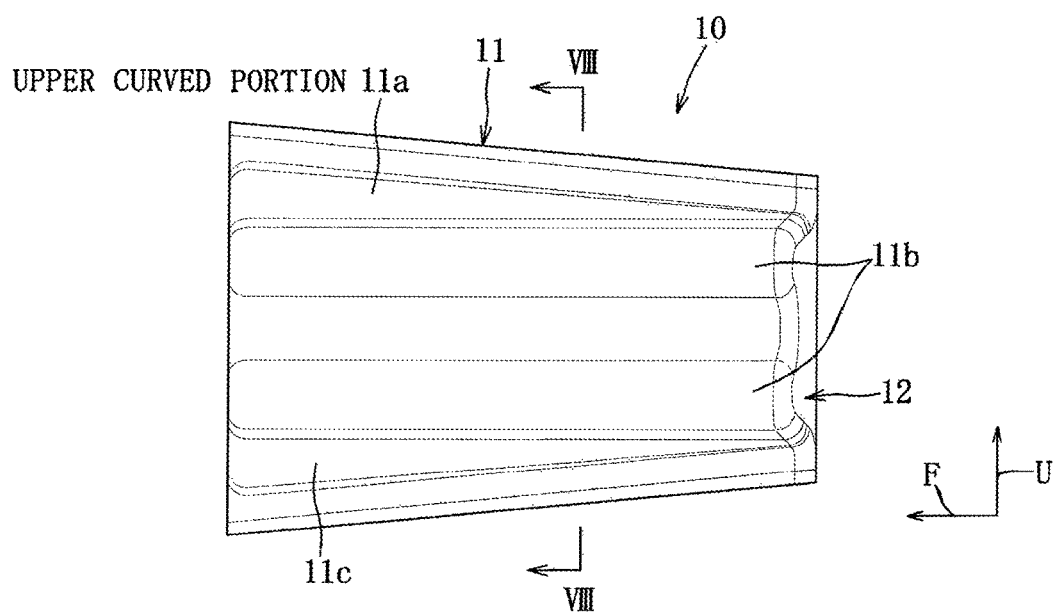
FIG. 6 is a side view of the crash can.
Figure 7:
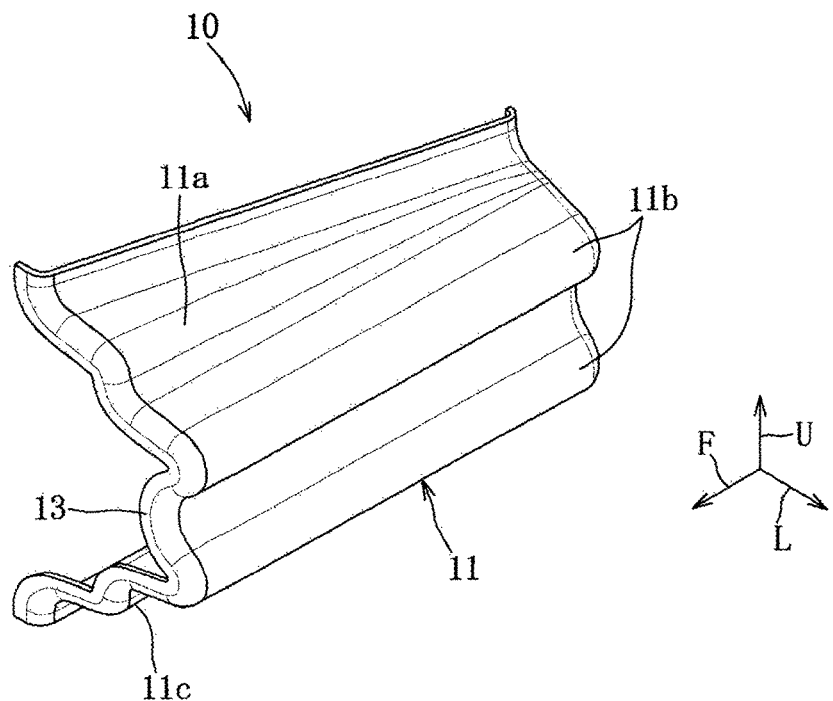
FIG. 7 is a perspective view when viewing the crash can obliquely from front.
Figure 8:
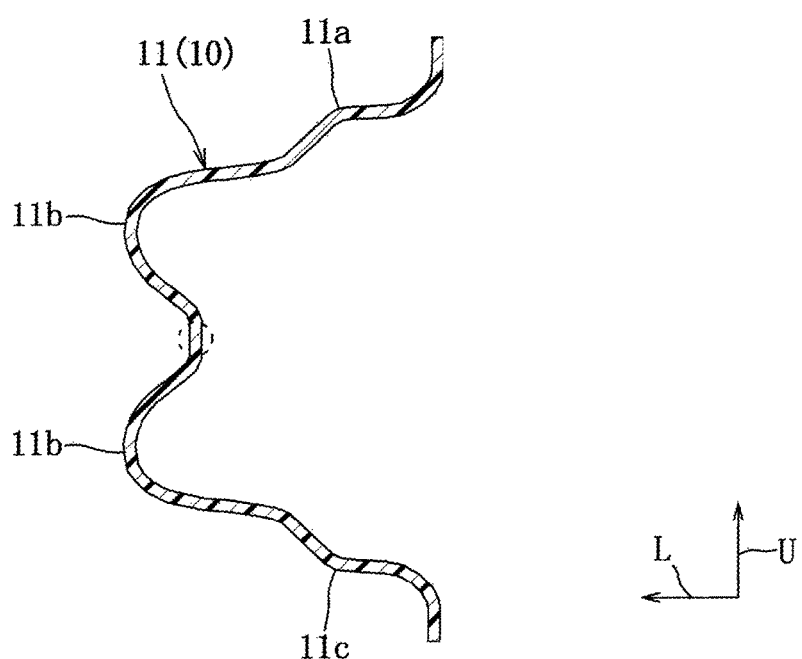
FIG. 8 is a sectional view taken along line VIII-VIII of FIG. 6.

As shown in FIGS. 6 to 8, the side wall portion 11 includes: an upper curved portion 11a having a substantially partial conical shape; two intermediate curved portions 11b arranged at respective upper and lower sides and each having a substantially partial cylindrical shape; and a lower curved portion 11c having a substantially partial conical shape.

Each of the upper curved portion 11a and the lower curved portion 11c is formed to have a partial circular-arc vertical section perpendicular to the forward/rearward direction, and a diameter of the partial circular-arc vertical section decreases toward the rear side.

Each of the upper and lower intermediate curved portions 11b is formed to have a partial circular-arc vertical section perpendicular to the forward/rearward direction, and a diameter of the partial circular-arc vertical section is substantially constant in the forward/rearward direction.

Therefore, the side wall portion 11 is formed such that an upper-lower width thereof increases toward the front side in a side view.

As shown in FIG. 8, a lower end portion of the upper curved portion 11a is continuous with an upper end portion of the upper intermediate curved portion 11b in a curved manner without forming a corner portion, and an upper end portion of the lower curved portion 11c is continuous with a lower end portion of the lower intermediate curved portion 11b in a curved manner without forming a corner portion.

Since a lower end portion of the upper curved portion 11a and an upper end portion of the lower intermediate curved portion 11b are continuous with each other in a curved manner, a concave portion that is concave to the right side and extends in the forward/rearward direction is formed at a middle-stage part of the side wall portion 11.

The carbon fiber resin forming the crash can 10 will be explained.

Figure 9:
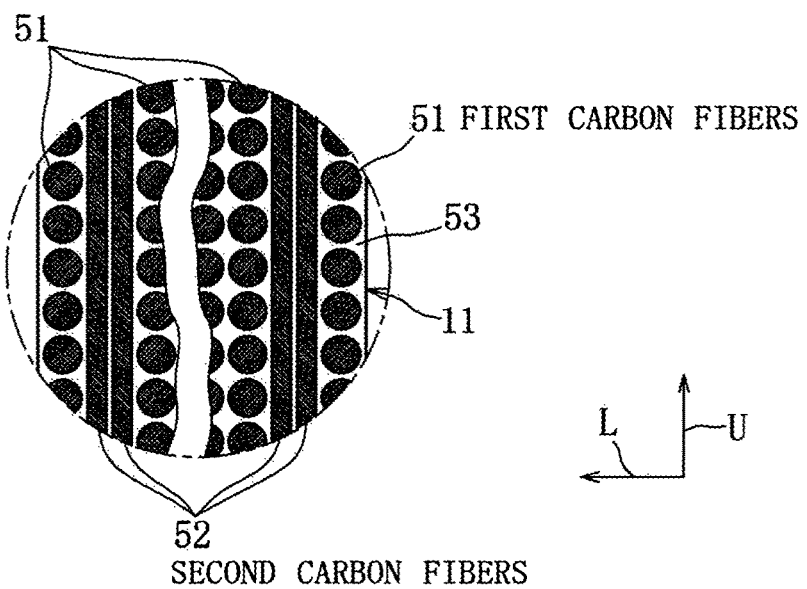
FIG. 9 is an enlarged view of an important part of FIG. 8.

As shown in FIG. 9, each of first carbon fibers 51 corresponding to most of the carbon fibers contained in the carbon fiber resin is constituted by a fiber bundle (tow) obtained by bundling a predetermined number (for example, 12 k) of single fibers (filaments) extending continuously and uniformly from a front end to rear end of the carbon fiber resin molded body. Each of second carbon fibers 52 corresponding to some of the carbon fibers contained in the carbon fiber resin is constituted by a fiber bundle obtained by bundling a predetermined number of single fibers extending continuously and uniformly from an upper end to lower end of the carbon fiber resin molded body. A diameter of the single fiber of the carbon fiber is, for example, 7 to 10 μm. Used as a base material 53 of the carbon fiber resin molded body is thermosetting epoxy synthetic resin.

As shown in FIG. 9, one layer of the first carbon fibers 51 is arranged at a thickness direction left end of the side wall portion 11, and one layer of the first carbon fibers 51 is arranged at a thickness direction right end of the side wall portion 11. Further, two layers of the second carbon fibers 52 perpendicular to the first carbon fibers 51 are arranged at an inner side of each of the above layers of the first carbon fibers 51. Then, a plurality of layers of the first carbon fibers 51 are arranged between the left and right second carbon fibers 52. With this, in vehicle collision, parts corresponding to the first carbon fibers 51 arranged at both respective thickness direction end portions can obtain a function of a fronds portion, and a part corresponding to the first carbon fibers 51 arranged at a thickness direction intermediate part can obtain a function of a pillar portion.

Therefore, when a compressive load acts on the side wall portion 11 in the forward/rearward direction, the parts of the first carbon fibers 51 corresponding to the fronds portion cause delamination fracture prior to the part of the first carbon fibers 51 corresponding to the pillar portion. Then, the part of the first carbon fibers 51 corresponding to the pillar portion causes compression fracture. These delamination fracture and compression fracture progressively proceed forward from the rear end portion (compressive load input-side end portion). Thus, the progressive fracture is caused.

With this, the pillar portion having a large left-right width is stably formed, and thus, a large EA amount is secured.

In addition, when the parts of the first carbon fibers 51 corresponding to the fronds portion cause the delamination fracture, the second carbon fibers 52 form a fiber bridge between the plurality of first carbon fibers 51, so that cutting energy of the second carbon fibers 52 cut by a tensile load is utilized for energy absorption.

Figure 15:
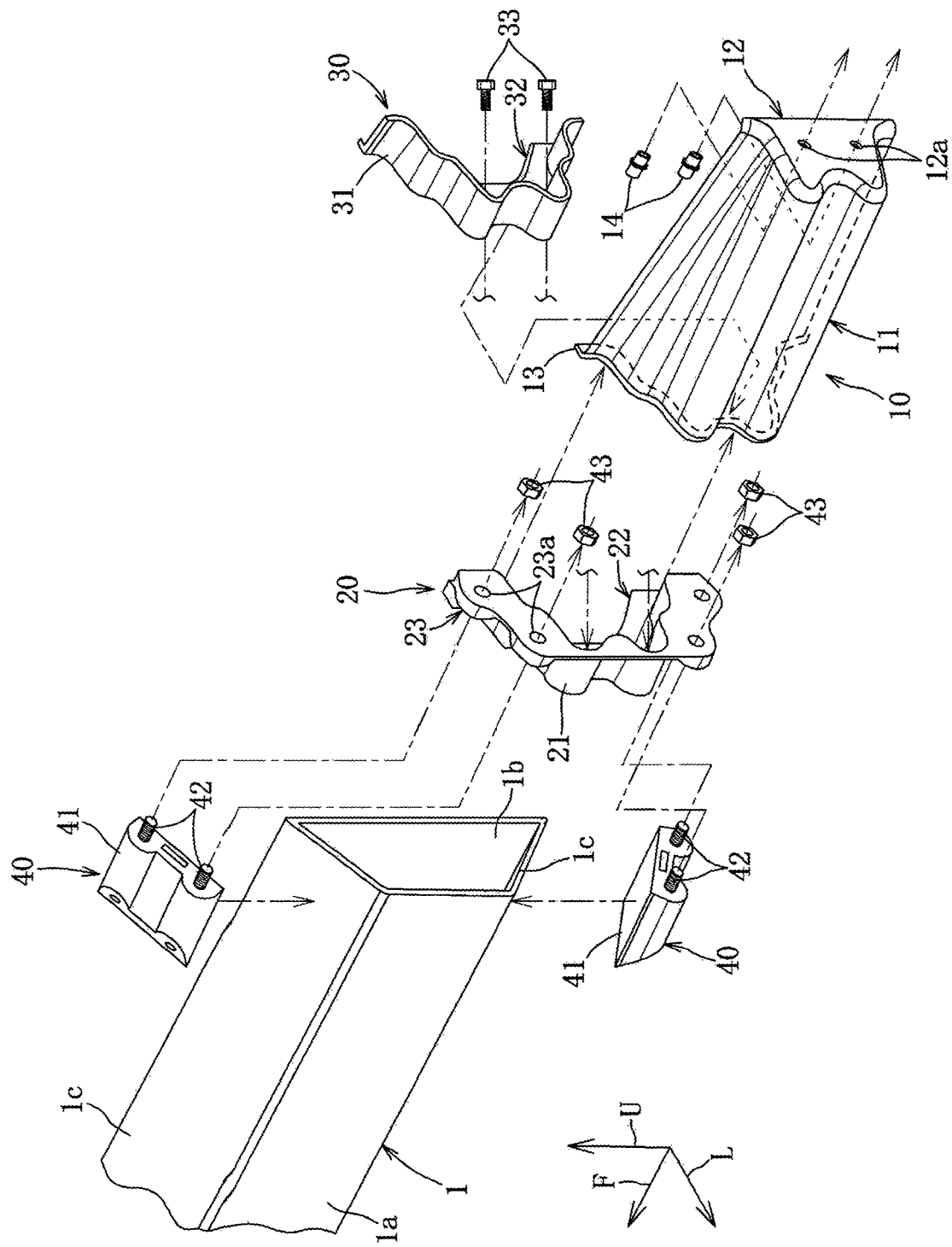
FIG. 15 is an exploded perspective view showing the crash can, the outer bracket, the inner bracket, and bolt attaching members.

As shown in FIG. 15, the tip end wall portion 12 is formed from an upper end portion to lower end portion of the rear end portion of the side wall portion 11 so as to close a substantially entire region in the forward/rearward direction.

With this, the compressive load input through the bumper reinforcement 3 is uniformly dispersed and transmitted to an entire region of the rear end portion of the side wall portion 11 by the tip end wall portion 12.

As shown in FIG. 12, the tip end wall portion 12 extends from the rear end portion of the side wall portion 11 along the front wall portion of the bumper reinforcement 3. An intersection angle θ between the side wall portion 11 and the tip end wall portion 12 is set to an obtuse angle, specifically to a range of 90° to 120°. The intersection angle θ is preferably set to a range of 95° to 115°. In the present embodiment, the intersection angle θ is set to about 100°.

With this, when a compressive load is input from the bumper reinforcement 3 to the tip end wall portion 12 in the forward/rearward direction, a load input to a boundary (corner part) between the side wall portion 11 and the tip end wall portion 12 acts intensively, and thus, a fracture start point is generated.

In the tip end wall portion 12, the first carbon fibers 51 extend from the side wall portion 11 to a right end portion of the tip end wall portion 12. Therefore, the first carbon fibers 51 are arranged so as to substantially uniformly extend in the leftward/rightward direction.

Figure 4:
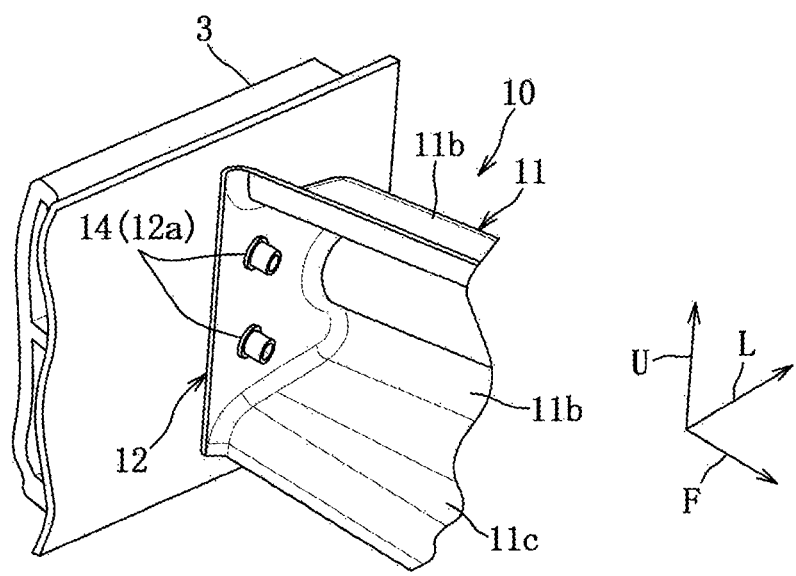
FIG. 4 is a perspective view of a vicinity of a rear end-side part of a crash can.
Figure 5:
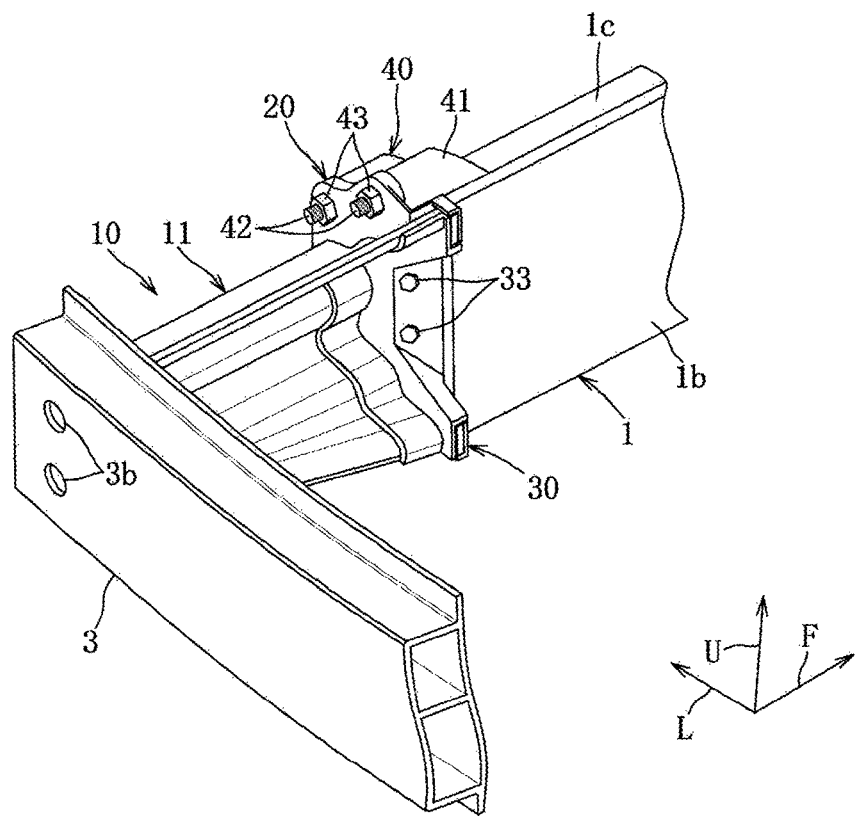
FIG. 5 is a perspective view of a vicinity of a front end-side part of the crash can.

As shown in FIGS. 4, 12, and 15, a pair of upper and lower attaching portions 12a (opening portions) for attaching the bumper reinforcement 3 are formed at the tip end wall portion 12.

Therefore, a fiber cut part in which the first carbon fibers 51 are being cut is formed around the pair of upper and lower attaching portions 12a, and the support strength of the bumper reinforcement 3 decreases.

On this account, nut members 14 which can be threadedly engaged with bolts 15 are internally fitted in the respective attaching portions 12a.

With this, a pair of bolts 15 inserted through the pair of upper and lower bolt holes 3a of the bumper reinforcement 3 are fastened to the nut members 14 internally fitted in the tip end wall portion 12. Thus, the bumper reinforcement 3 is attached to the rear end portion of the crash can 10.

As shown in FIGS. 7, 10, 11, and 15, the flange portion 13 is formed from an upper end portion to lower end portion of the front end portion of the side wall portion 11. The flange portion 13 extends from the front end portion of the side wall portion 11 to the right side (i.e., to a center axis of the crash can 10) so as to be substantially perpendicular to the side wall portion 11. In the flange portion 13, the first carbon fibers 51 extend from the side wall portion 11 to an inner end portion of the flange portion 13. Therefore, each of the first carbon fibers 51 is arranged so as to substantially uniformly extend in a radial direction toward the center axis of the crash can 10.

Next, an outer bracket 20 and an inner bracket 30 will be explained.

As shown in FIGS. 5, 10, 11, and 15, the outer bracket 20 and the inner bracket 30 sandwich a front end-side part of the crash can 10 (i.e., a part of a front end-side part of the side wall portion 11 and the flange portion 13) in a thickness direction of the crash can 10 and fix the crash can 10 to the bolt attaching members 40 supported by the rear side frame 1.

With this, the crash can 10 can be attached to the rear side frame 1 without forming the fiber cut part at the front end-side part of the crash can 10.

Figure 11:
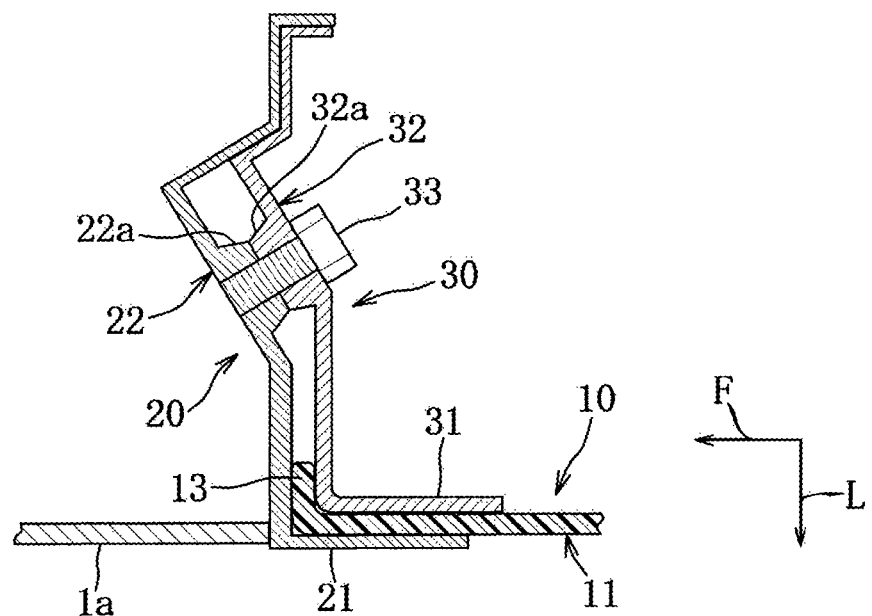
FIG. 11 is a sectional view taken along line XI-XI of FIG. 3.

As shown in FIGS. 13A to 13D, the outer bracket 20 is integrally formed by an aluminum alloy material and includes: a main body portion 21 having a substantially semi-circular shape in a front view; an inclined portion 22 (outer inclined portion); an attaching portion 23; and the like. As shown in FIGS. 10 and 11, the main body portion 21 is formed to have a substantially L-shaped vertical section. When the outer bracket 20 and the inner bracket 30 sandwich the crash can 10, the main body portion 21 is brought into surface contact with an outer peripheral surface of the front end-side part of the crash can 10.

The inclined portion 22 is formed from a right end portion of the main body portion 21 in such an inclined shape that a right part of the inclined portion 22 is located at the front side. The inclined portion 22 is provided with: a pair of upper and lower boss portions 22a projecting rearward; and a pair of upper and lower fastening holes 22b formed at the respective boss portions 22a. Screw grooves with which bolts 33 can be threadedly engaged are formed at the respective fastening holes 22b.

The attaching portion 23 is provided at a radially outer side of the main body portion 21. The attaching portion 23 includes a pair of left and right bolt holes 23a provided at each of upper and lower positions of the main body portion 21.

These bolt holes 23a are formed at such positions that when attaching the crash can 10 to the rear side frame 1, the bolt portions 42 of the bolt attaching members 40 can be inserted through the respective bolt holes 23a.

As shown in FIGS. 14A to 14D, the inner bracket 30 is integrally formed by an aluminum alloy material and includes: a main body portion 31 having a substantially semi-circular shape in a front view; an inclined portion 32 (inner inclined portion); and the like. As shown in FIGS. 10 and 11, the main body portion 31 is formed to have a substantially L-shaped vertical section. When the outer bracket 20 and the inner bracket 30 sandwich the crash can 10, the main body portion 31 is brought into surface contact with an inner peripheral surface of the front end-side part of the crash can 10.

The inclined portion 32 is formed from a right end portion of the main body portion 31 in such an inclined shape that a right part of the inclined portion 32 is located at the front side. The inclined portion 32 is provided with: a pair of upper and lower boss portions 32a projecting forward; and a pair of upper and lower bolt holes 32b formed at the respective boss portions 32a.

When the outer bracket 20 and the inner bracket 30 sandwich the crash can 10, the bolts 33 inserted through the respective bolt holes 32b are fastened to the respective fastening holes 22b.

With this, the inclined portion 22 and the inclined portion 32 are superposed on each other, and the main body portion 21 and the main body portion 31 are press fitted to a part of the front end-side part of the side wall portion 11 and the flange portion 13. Thus, the crash can 10, the outer bracket 20, and the inner bracket 30 are integrated as a unit.

An assembling procedure of the crash can 10 will be explained based on FIG. 15.

As a preparation step, the bolt attaching members 40 are joined to the respective upper and lower wall portions 1c and 1d of the rear side frame 1 at a vehicle body.

The outer bracket 20 is superposed on an outer peripheral side of the front end-side part of the crash can 10, and the inner bracket 30 is superposed on an inner peripheral side of the front end-side part of the crash can 10. Then, the bolts 33 are inserted through the respective bolt holes 32b and fastened to the respective fastening holes 22b. Thus, the crash can 10 is integrated with the brackets 20 and 30 to form a crash can unit.

Next, the crash can unit is attached to the rear side frame 1.

At this time, since the bottom portions of the main body portions 41 of the bolt attaching members 40 project rearward beyond the rear end portion of the rear side frame 1, an outer peripheral portion of the main body portion 21 of the outer bracket 20 is guided forward along the bottom portions of the main body portions 41, and the bolt portions 42 are inserted through the respective bolt holes 23a.

By fastening the nuts 43 to the respective bolt portions 42 inserted through the respective bolt holes 23*a*, the crash can unit is coupled and fixed to the rear side frame 1.

The bumper reinforcement 3 may be coupled to the crash can 10 before the crash can unit is fastened and fixed to the rear side frame 1, or the bumper reinforcement 3 may be coupled to the crash can 10 after the crash can unit is fastened and fixed to the rear side frame 1.

Next, actions and effects of the impact absorbing member structure of the vehicle V of the present embodiment will be explained.

The impact absorbing member structure includes the pair of left and right crash cans 10 made of CFRP and each including the plurality of first carbon fibers 51 arranged so as to continuously extend in the forward/rearward direction. Therefore, in vehicle collision, the impact energy can be absorbed by using the progressive fracture of the crash can 10.

The crash can 10 is formed as an open-section member including the tip end wall portion 12 formed at the tip end portion of the crash can 10, the bumper reinforcement 3 being attached to the tip end wall portion 12. Therefore, in vehicle collision, the progressively fractured fiber-reinforced resins (CFRP) are not accumulated in the crash can 10 and can be discharged to the outside of the crash can 10. Thus, the crash can 10 can be completely crushed.

The crash can 10 includes: the plurality of first carbon fibers 51 arranged so as to continuously extend in the forward/rearward direction and constituting most of reinforced fibers contained in the crash can 10; and the plurality of second carbon fibers 52 arranged so as to continuously extend in the direction intersecting with the direction in which the first carbon fibers 51 extend. In a vertical sectional view perpendicular to the forward/rearward direction, the plurality of curved portions are formed at the crash can 10. With this, when the parts corresponding to the first carbon fibers 51 cause the delamination fracture, the second carbon fibers 52 form a fiber bridge between the first carbon fibers 51, so that the cutting energy generated when the second carbon fibers 52 are cut by the tensile load can be used for the impact energy absorption.

Since the plurality of curved portions are formed to have a plurality of partial circular-arc shapes, the tensile load can evenly act on the second carbon fibers 52, and the impact energy can be further absorbed.

The crash can 10 (side wall portion 11) is formed such that an upper-lower width thereof decreases toward the rear side. Therefore, in vehicle collision, an input load per unit area of a rear end part of the side wall portion 11 can be made larger than an input load per unit area of a front end-side part of the side wall portion 11, and the start point of the progressive fracture can be surely formed at the rear end part.

The plurality of second carbon fibers 52 are arranged at each of both thickness direction end vicinity parts of each crash can 10. Therefore, in vehicle collision, the pillar portion having a large width can be stably formed by reducing the thickness of the fronds portion formed at the side wall portion 11, and this can increase the EA performance.

Embodiment 2

Figure 16:
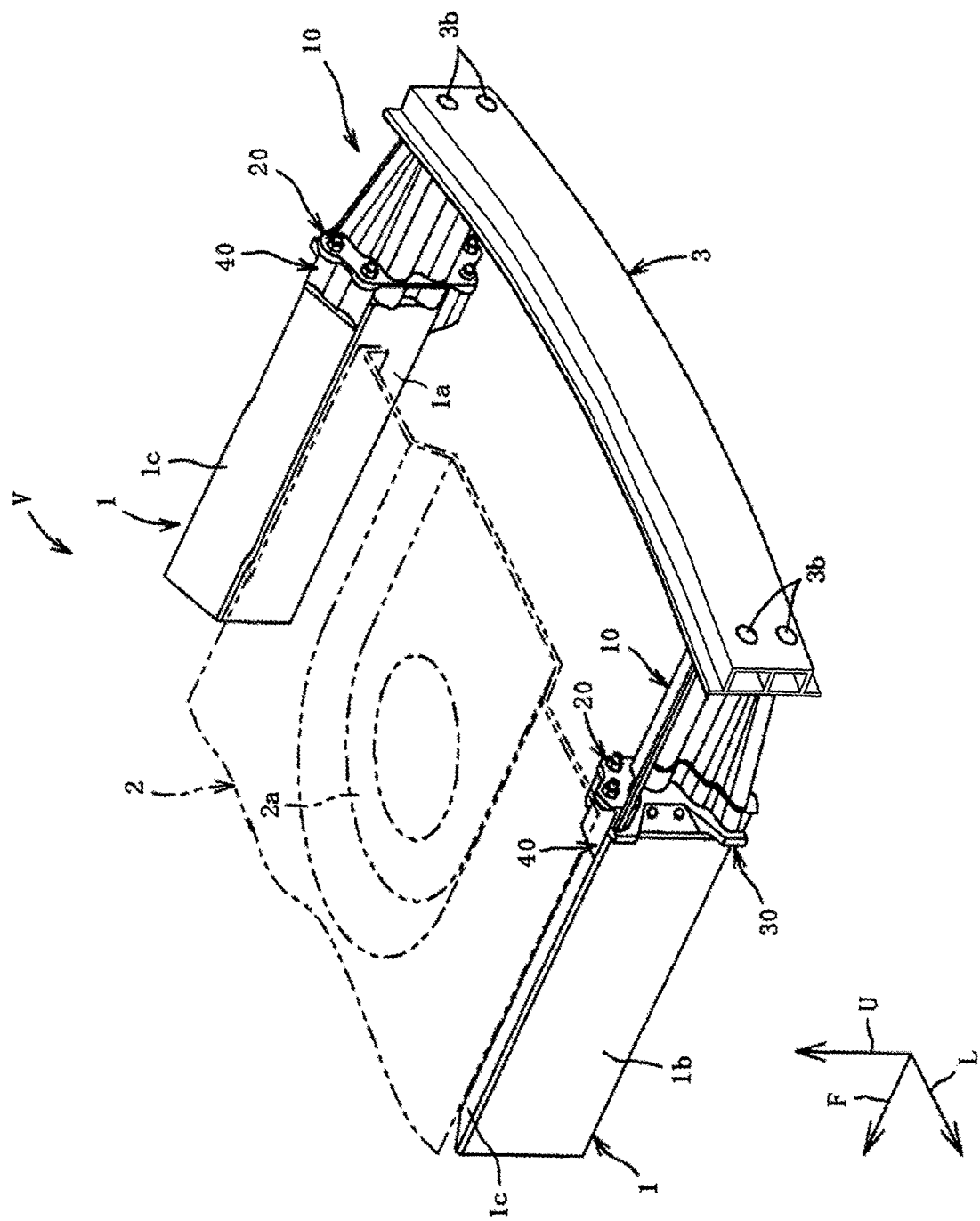
FIG. 16 is a perspective view of the vehicle body rear portion of the vehicle including the impact absorbing member structure according to Embodiment 2.
Figure 17:
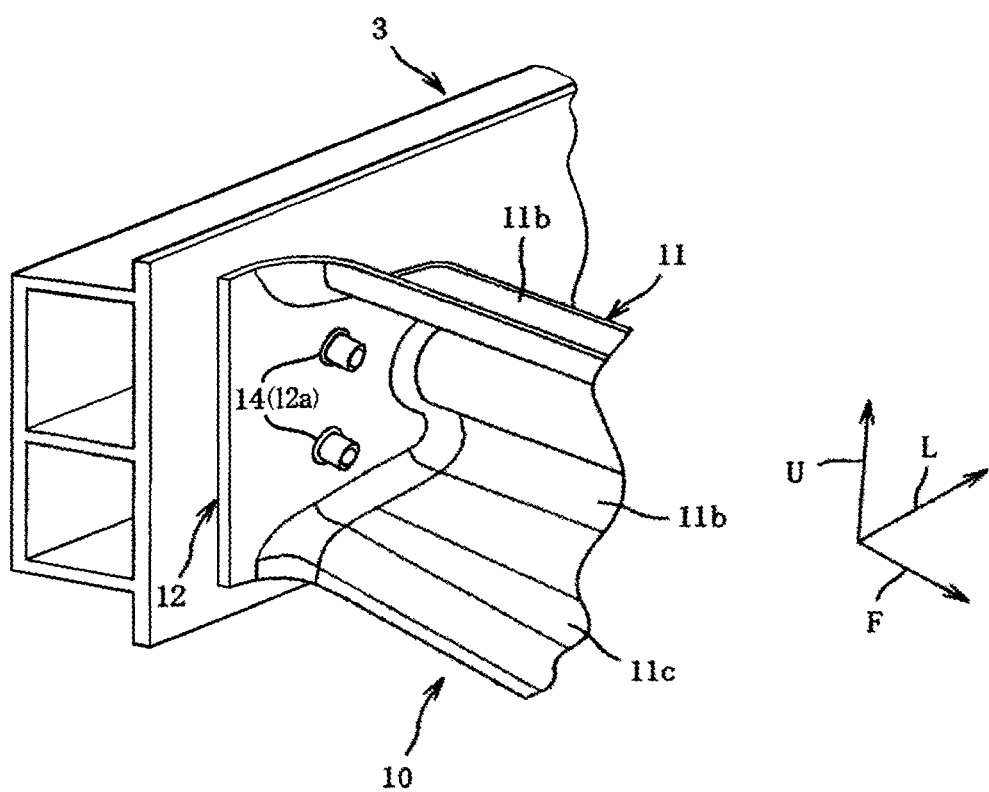
FIG. 17 is a perspective view showing a vicinity of the rear end-side part of the crash can.

Next, Embodiment 2 of the present invention will be explained based on FIGS. 16 and 17. In Embodiment 2, differences from Embodiment 1 will be mainly explained, and a repetition of the same explanation as Embodiment 1 is avoided. FIG. 16 is a perspective view of the vehicle body rear portion of the vehicle V including the impact absorbing member structure according to Embodiment 2 and corresponds to FIG. 1 of Embodiment 1. FIG. 17 is a perspective view showing a vicinity of the rear end-side part of the crash can 10 of Embodiment 2 and corresponds to FIG. 4 of Embodiment 1. It should be noted that FIG. 4 shows the left crash can 10, and FIG. 17 shows the right crash can 10.

As is clear from a comparison between FIG. 1 and FIG. 16, an opening direction of the crash can 10 of the present embodiment is opposite to an opening direction of the crash can 10 of Embodiment 1. Specifically, in the present embodiment, the left crash can 10 is formed so as to be open toward the left side in a vertical section perpendicular to the forward/rearward direction, and the right crash can 10 is formed so as to be open to the right side in a vertical section perpendicular to the forward/rearward direction. To be specific, each of the crash cans 10 of the present embodiment is formed as an open-section member that is open at a vehicle width direction outer side. As shown in FIG. 17, the crash can 10 of the present embodiment includes the tip end wall portion 12 at the tip end portion thereof, and this is the same as Embodiment 1.

Since the opening direction of the crash can 10 of the present embodiment is opposite to that of Embodiment 1, the shapes of the rear side frame 1, the outer bracket 20, the inner bracket 30, and the bolt attaching member 40 in the present embodiment are opposite to those in Embodiment 1 in the leftward/rightward direction. From a different point of view, the rear side frame 1, the outer bracket 20, the inner bracket 30, and the bolt attaching member 40 arranged at the right side in Embodiment 1 are arranged at the left side in the present embodiment, and the rear side frame 1, the outer bracket 20, the inner bracket 30, and the bolt attaching member 40 arranged at the left side in Embodiment 1 are arranged at the right side in the present embodiment.

As above, in the present embodiment, the crash can 10 is formed as the open-section member that is open at the vehicle width direction outer side. However, as with Embodiment 1, in vehicle collision, the progressively fractured fiber-reinforced resins (CFRP) are not accumulated in the crash can 10 and can be discharged to an outside of the crash can 10. Thus, the crash can 10 can be completely crushed.

Next, modified examples obtained by partially modifying the above embodiments will be explained.

1) The above embodiment has explained an example in which the present invention is applied to the rear crash can attached to the rear side frame. However, the present invention may be applied to a front crash can attached to a front side frame.

Further, the above embodiment has explained an example in which the present invention is applied to the crash can configured as a partial tubular open-section member that is open at a vehicle width direction inner side. However, the crash can may have a rectangular vertical section perpendicular to the forward/rearward direction, and a so-called side wall portion may have a plate shape.

2) The above embodiment has explained an example of the crash can using the carbon fiber resin. However, at least general-purpose reinforced fibers, such as glass fibers or metal fibers, may be used.

The base material resin may be arbitrarily selected depending on the specification of the crash can.

3) The above embodiment has explained an example in which the second carbon fibers are arranged so as to be perpendicular to the first carbon fibers. However, the second carbon fibers are only required to intersect with the first carbon fibers. For example, the second carbon fibers having an intersection angle of 45° or 60° with respect to the first carbon fibers may be used.

4) The above embodiment has explained an example in which the bolt portions are provided at the main body portion of the bolt attaching member. However, a fastening hole including a screw groove may be formed at the main body portion, and the attaching portion of the outer bracket may be fastened and fixed by a bolt.

5) In addition to the above, a skilled person can exploit embodiments obtained by making various modifications to the above embodiments or combining the embodiments within the scope of the present invention, and the present invention contains such modified embodiments.

LIST OF REFERENCE CHARACTERS 3 bumper reinforcement
10 crash can
11 side wall portion
11a upper curved portion
11b intermediate curved portion
11c lower curved portion
11c tip end wall portion
12a attaching portion
51 first carbon fiber
52 second carbon fiber
V vehicle

The invention claimed is:

1. An impact absorbing member structure of a vehicle, the impact absorbing member structure comprising:
a pair of left and right impact absorbing members arranged at a vehicle body forward/rearward direction tip end-side part of the vehicle and made of fiber-reinforced resin, the pair of left and right impact absorbing members each containing a plurality of reinforced fibers arranged so as to continuously extend in a forward/rearward direction; and
a bumper reinforcement attached to tip end portions of the pair of impact absorbing members and extending in a vehicle width direction, wherein:
each of the impact absorbing members is formed as an open-section member including a tip end wall portion formed at a tip end portion of the impact absorbing member, the bumper reinforcement being attached to the tip end wall portion;
each of the impact absorbing members includes:
a plurality of first reinforced fibers arranged so as to continuously extend in a vehicle body forward/rearward direction and constituting most of the reinforced fibers contained in the impact absorbing member, and
a plurality of second reinforced fibers arranged so as to continuously extend in a direction intersecting with the direction in which the first reinforced fibers extend;
each of the impact absorbing members includes a side wall portion extending in the forward/rearward direction;
the side wall portion includes an intermediate curved portion that is convex inward or outward in the vehicle width direction;
the plurality of second reinforced fibers are arranged at both thickness direction end vicinity parts of each of the pair of impact absorbing members; and the first reinforced fibers are arranged at both thickness direction outermost end parts of each of the pair of impact absorbing members.

2. The impact absorbing member structure according to claim 1, wherein a top part of the intermediate curved portion has a partial circular-arc shape in a vertical sectional view perpendicular to the forward/rearward direction.

3. The impact absorbing member structure according to claim 1, wherein each of the impact absorbing members is formed such that an upper-lower width thereof decreases toward the tip end portion.

4. An impact absorbing member structure of a vehicle, the impact absorbing member structure comprising:
a pair of left and right impact absorbing members arranged at a vehicle body forward/rearward direction tip end-side part of the vehicle and made of fiber-reinforced resin, the pair of left and right impact absorbing members each containing a plurality of reinforced fibers arranged so as to continuously extend in a forward/rearward direction; and
a bumper reinforcement attached to tip end portions of the pair of impact absorbing members and extending in a vehicle width direction, wherein:
each of the impact absorbing members is formed as an open-section member including a tip end wall portion formed at a tip end portion of the impact absorbing member, the bumper reinforcement being attached to the tip end wall portion;
each of the impact absorbing members includes a side wall portion extending in the forward/rearward direction;
the side wall portion includes an upper-end part, a lower-end part, and a middle-stage part located between the upper-end part and the lower-end part, and the middle-stage part swells inward or outward in the vehicle width direction;
the middle-stage part of the side wall portion includes two intermediate curved portions, the two intermediate curved portions being convex in a direction in which the side wall portion swells and being located at respective positions different from each other in an upper-lower direction;
the middle-stage part of the side wall portion includes a concave portion, the concave portion being located between the two intermediate curved portions and being concave in a direction opposite to the direction in which the side wall portion swells, the concave portion including a bottom part located on one side of the upper-end part and lower-end part of the side wall portion, the one side being located in the direction in which the side wall portion swells;
the side wall portion includes an upper curved portion, the upper curved portion being located between the upper-end part of the side wall portion and the intermediate curved portion located on an upper side out of the two intermediate curved portions, the upper curved portion being curved in a vertical sectional view perpendicular to the forward/rearward direction; and
the side wall portion includes a lower curved portion, the lower curved portion being located between the lower-end part of the side wall portion and the intermediate curved portion located on a lower side out of the two intermediate curved portions, the lower curved portion being curved in the vertical sectional view perpendicular to the forward/rearward direction.

5. The impact absorbing member structure according to claim 4, wherein:

each of the impact absorbing members includes:
- a plurality of first reinforced fibers arranged so as to continuously extend in a vehicle body forward/rearward direction and constituting most of the reinforced fibers contained in the impact absorbing member, and
- a plurality of second reinforced fibers arranged so as to continuously extend in a direction intersecting with the direction in which the first reinforced fibers extend; and in the vertical sectional view perpendicular to the forward/rearward direction, a plurality of curved portions are formed at each of the impact absorbing members.

6. The impact absorbing member structure according to claim 5, wherein the plurality of curved portions are formed to have a plurality of partial circular-arc shapes.

7. The impact absorbing member structure according to claim 4, wherein each of the impact absorbing members is formed such that an upper-lower width thereof decreases toward the tip end portion.

8. The impact absorbing member structure according to claim 5, wherein the plurality of second reinforced fibers are arranged at both thickness direction end vicinity parts of each of the pair of impact absorbing members.

\* \* \* \* \*